United States Patent
Undy et al.

[11] Patent Number: 5,860,096
[45] Date of Patent: Jan. 12, 1999

[54] MULTI-LEVEL INSTRUCTION CACHE FOR A COMPUTER

[75] Inventors: Stephen R. Undy; Patrick Knebel; Craig A. Gleason, all of Fort Collins, Colo.

[73] Assignee: Hewlett-Packard Company, Palo Alto, Calif.

[21] Appl. No.: 768,417

[22] Filed: Dec. 18, 1996

Related U.S. Application Data

[63] Continuation of Ser. No. 323,986, Oct. 17, 1994, abandoned.

[51] Int. Cl.⁶ .................................................... G06F 12/08
[52] U.S. Cl. .......................................... 711/122; 711/125
[58] Field of Search ...................................... 395/449, 464, 395/421.03, 452, 387; 711/122, 123, 125 126, 137

[56] References Cited

U.S. PATENT DOCUMENTS

| | | | |
|---|---|---|---|
| 4,774,654 | 9/1988 | Pomerene et al. | 395/449 |
| 5,113,515 | 5/1992 | Fite et al. | 395/452 |
| 5,317,718 | 5/1994 | Jouppi | 395/464 |
| 5,377,336 | 12/1994 | Eickemeyer et al. | 395/375 |
| 5,553,254 | 9/1996 | Berstis et al. | 395/452 |
| 5,561,782 | 10/1996 | O'Connor | 395/452 |

*Primary Examiner*—Eddie P. Chan
*Assistant Examiner*—Hiep T. Nguyen
*Attorney, Agent, or Firm*—Augustus W. Winfield

[57] ABSTRACT

A multi-level instruction cache memory system for a computer processor. A relatively large cache has both instructions and data. The large cache is the primary source of data for the processor. A smaller cache dedicated to instructions is also provided. The smaller cache is the primary source of instructions for the processor. Instructions are copied from the larger cache to the smaller cache during times when the processor is not accessing data in the larger cache. A prefetch buffer transfers instructions from the larger cache to the smaller cache. If a cache miss occurs for the smaller cache, and the instruction is in the prefetch buffer, the system provides the instruction with no delay relative to a fetch from the smaller instruction cache. If a cache miss occurs for the smaller cache, and the instruction is being fetched from the larger cache, or available in the larger cache, the system provides the instruction with minimal delay relative to a fetch from the smaller instruction cache.

6 Claims, 6 Drawing Sheets

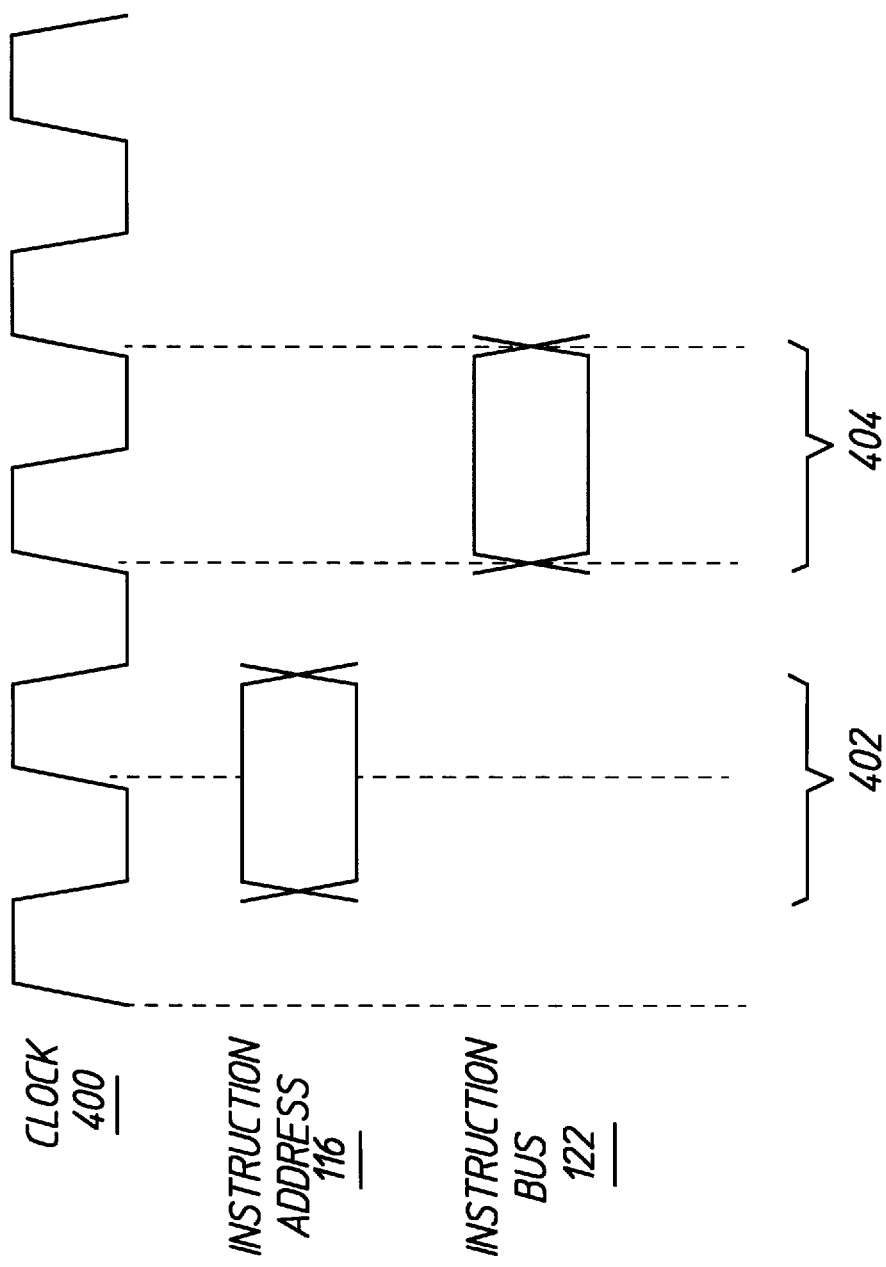

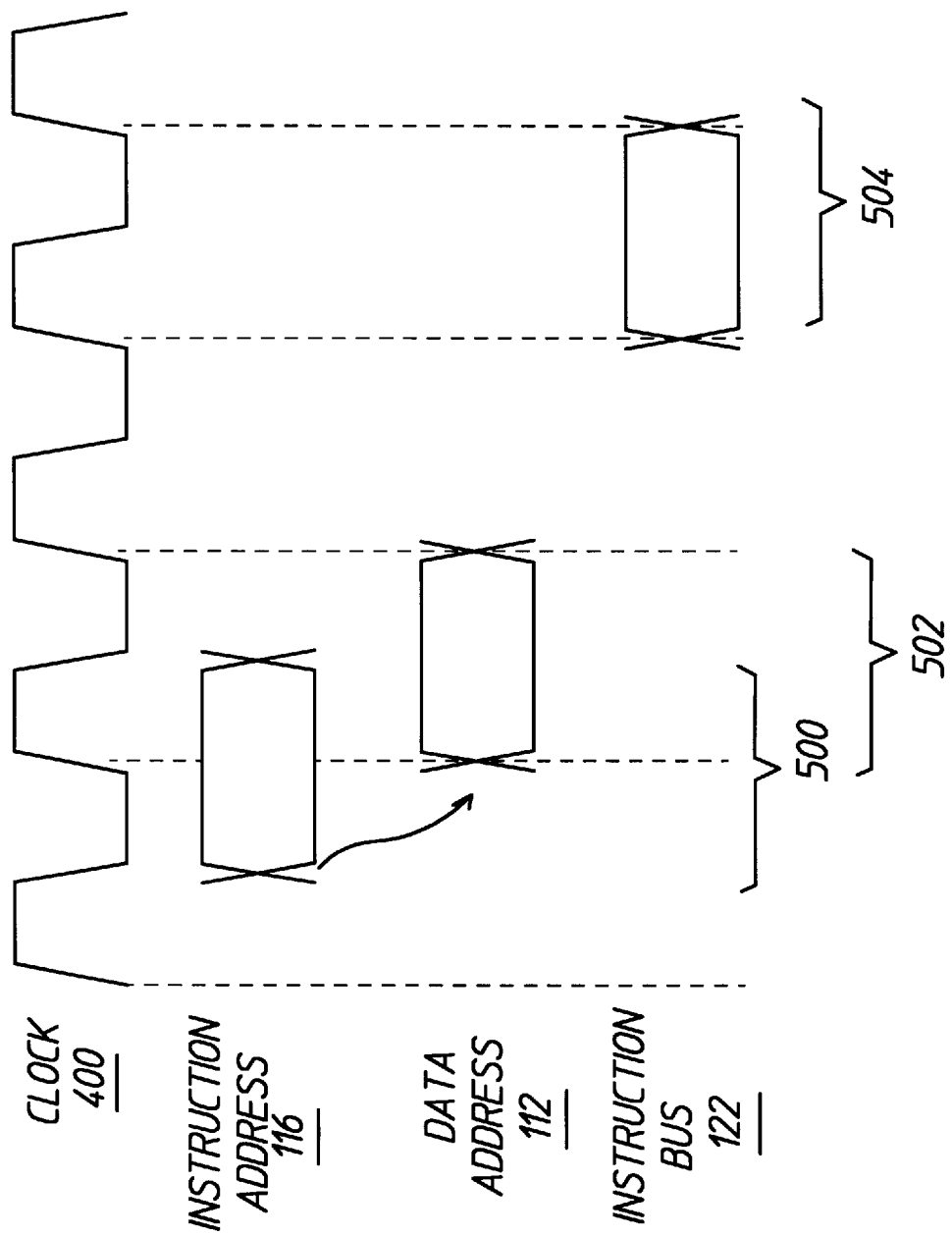

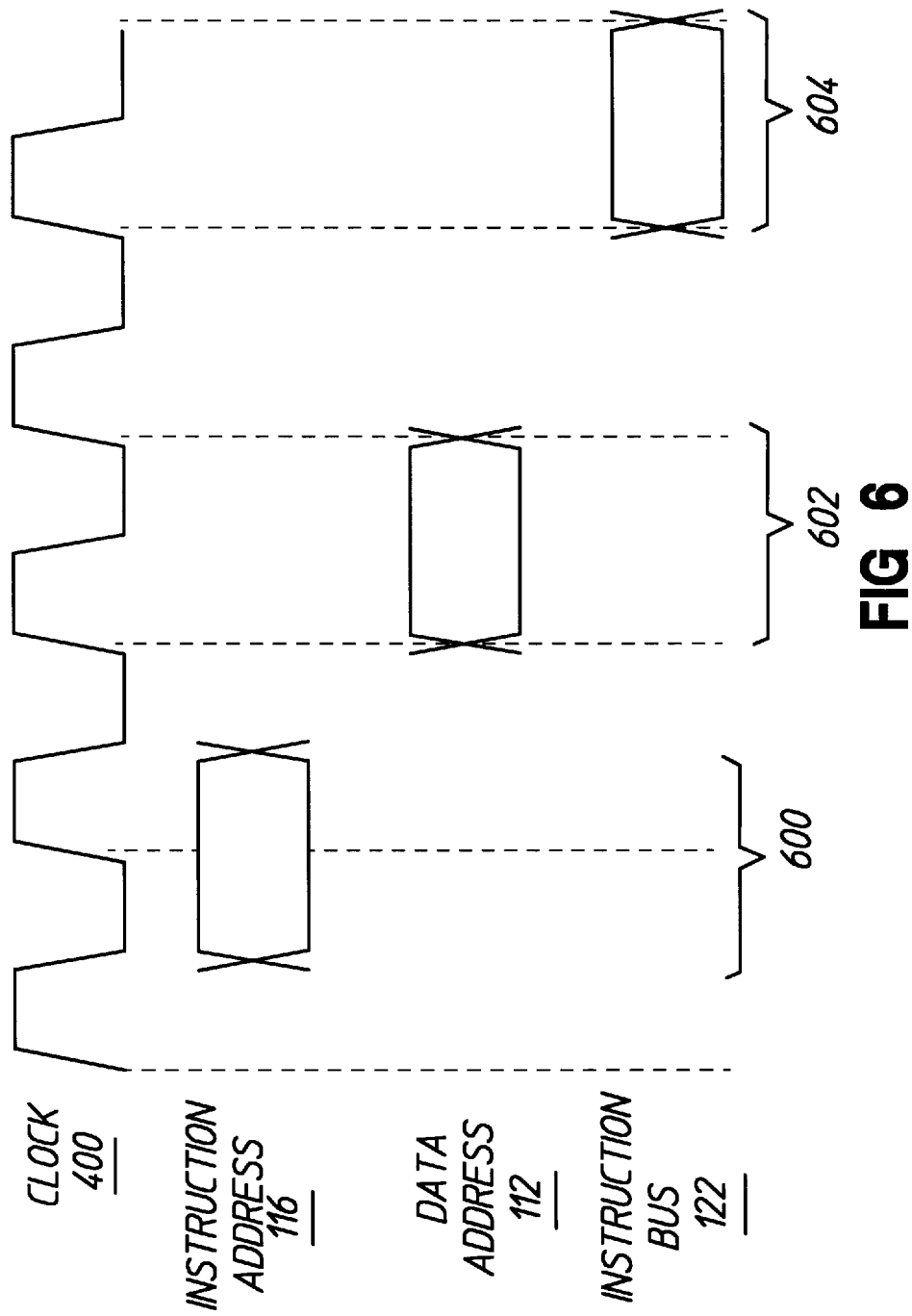

MULTI-LEVEL INSTRUCTION CACHE FOR A COMPUTER

CROSS REFERENCE TO RELATED APPLICATION

This is a continuation of application Ser. No. 08/323,986 filed on Oct. 17, 1994, now abandoned.

FIELD OF INVENTION

This invention relates generally to digital computers and more specifically to cache memory for computers.

BACKGROUND OF THE INVENTION

In most computer systems, a substantial portion of the system hardware and processing time involves data transfers between processors and memory and transfer of instructions from memory to processors. Computers often employ a hierarchy of memory with various trade offs between access time and cost. In particular, the most recently accessed data and instructions may be copied into an especially fast memory called a cache memory. For high performance, a cache memory for instructions is especially important. If the next instruction is in the cache memory, the processor can typically immediately execute the next instruction. If the next instruction is not in the cache memory (called a cache "miss"), the processor may have to pause while the next instruction is fetched from a slower memory elsewhere in the memory hierarchy. For high performance, there is a need to minimize cache misses and to minimize any delay in case of a cache miss.

Compared to the main memory, a cache memory is typically smaller, faster, more expensive, and physically closer to the processor. An integrated circuit processor may have the cache memory within the integrated circuit. In general, for performance, the cache memory needs to be large to minimize cache misses. Integrated circuit space, however, is limited so that a large on-chip cache is often impractical. There is a need for an instruction cache system providing high performance within a minimal amount of on-chip space.

SUMMARY OF THE INVENTION

A multiple level instruction cache memory system is provided, with a small cache memory dedicated to instructions and a larger cache memory used for both instructions and data. During times that the processor is not accessing the larger cache for data, a prefetch buffer transfers instructions from the larger cache to the smaller cache. If a cache miss occurs for the smaller cache, and the instruction is in the prefetch buffer, the system provides the instruction with no delay relative to a fetch from the smaller instruction cache. If a cache miss occurs for the smaller cache, and the instruction is being fetched from the larger cache, or available in the larger cache, the system provides the instruction with minimal delay relative to a fetch from the smaller instruction cache.

BRIEF DESCRIPTION OF THE DRAWINGS

FIG. 4 is a timing diagram for an instruction cache hit.

FIG. 5 is a timing diagram for an anticipated branch with an instruction cache hit for the branch address.

FIG. 6 is a timing diagram for an instruction cache miss with an instruction/data cache hit.

DETAILED DESCRIPTION OF THE PREFERRED EMBODIMENT OF THE INVENTION

Figure 1:
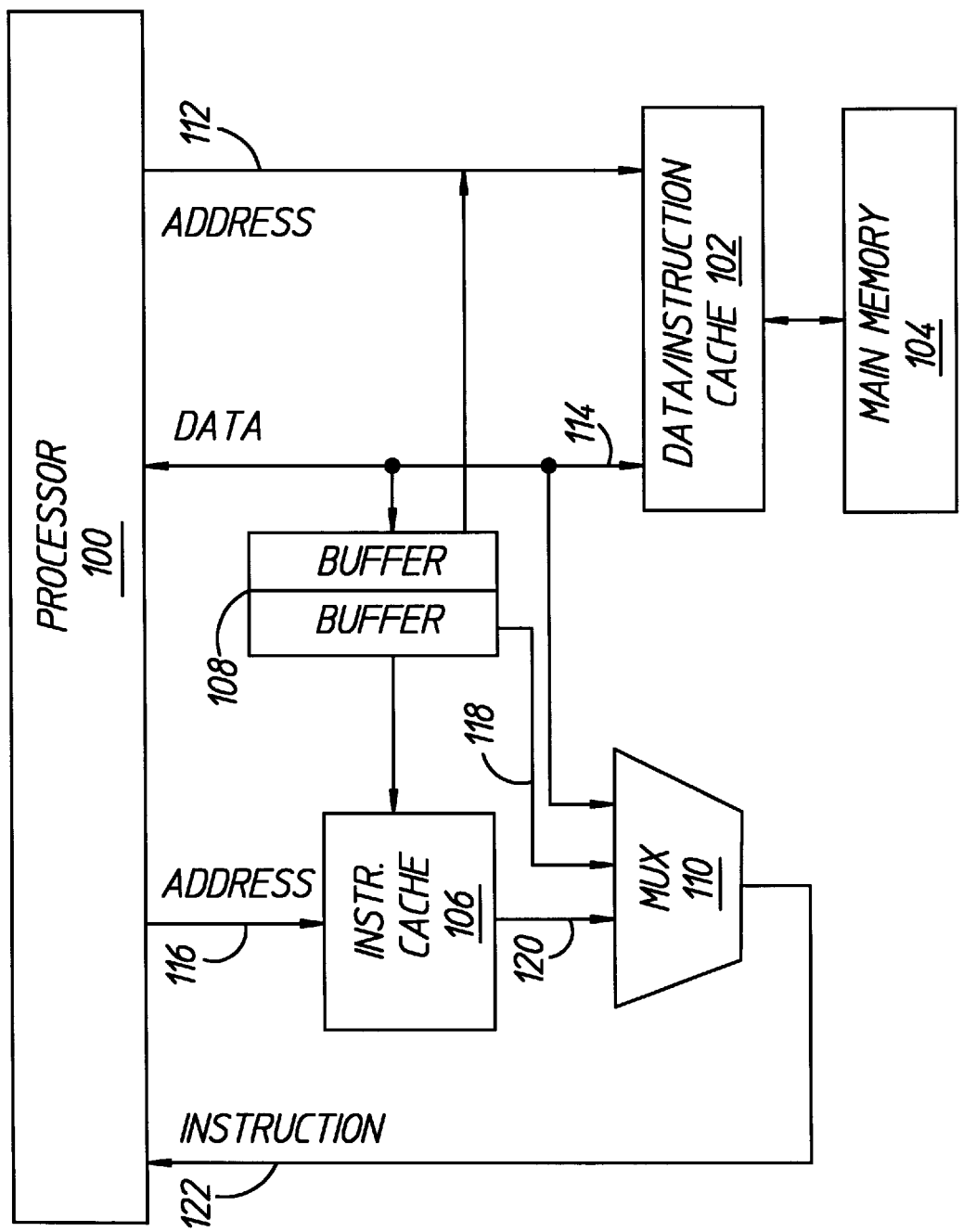
FIG. 1 is a block diagram schematic of a computer system containing the invention.

FIG. 1 illustrates a computer system containing the invention. A processor 100 has a relatively large cache 102 containing both instructions and data. The large data/instruction cache 102 contains copies of data and instructions from a main memory 104. A smaller cache 106 contains only instructions. A prefetch buffer 108 transfers instructions from cache 102 to cache 106 during times that the processor 100 is not accessing cache 102 for data. When processor 100 reads data from cache 102, addresses are issued on bus 112 and data is returned on bus 114. When processor 100 reads instructions from cache 106, addresses are issued on bus 116 and instructions are returned on bus 120 to bus 122. If a cache miss occurs for instruction cache 106, instructions may also be returned from the prefetch buffer 108 via bus 118, or from the data/instruction cache 102 via bus 114. A multiplexer 110 selects one of three inputs for the instruction to be returned.

In general, for memory systems, there are tradeoffs between speed, size and cost. The goal of a cache system is to make the memory system as seen by the processor appear to be both large and fast. In the system of FIG. 1, cache 106 is as fast as possible but is relatively "expensive" compared to memory 104. The additional goal of the multi-level system is to make cache 106 appear to be as large as memory 104. A multi-level cache as in FIG. 1 may be appropriate in any system where there is a substantial price/performance difference between cache systems. For example, instruction cache 106 may be internal to an integrated circuit processor and data/instruction cache 102 may be external. An on-chip cache is relatively "expensive" because integrated circuit space is limited, but an on-chip instruction cache is important for high performance.

In a specific embodiment of the invention, the external data/instruction cache 102 is 64 times larger than the internal instruction cache 106. Half of cache 102 is dedicated to instructions and half to data. In the specific embodiment, an instruction is one word, and transfers between cache 102 and cache 106 are two words wide.

In the specific embodiment of the invention, instructions are executed in six phases as follows:

1. Send the instruction address to the instruction cache.
2. Fetch and return the instruction.
3. Decode the instruction.
4. Data address computation.
5. Data access.
6. Register write.

Data addresses comprise a base address plus a displacement. For example, a displacement may be the contents of an index register. Therefore, in general, data addresses require an addition during phase 4. Some instructions do not access external data. For example, a branch instruction or an instruction involving only registers does not access external data. In the specific embodiment, the prefetch buffer 108 observes the instruction type as decoded in phase 3. If the instruction operation code is a code that does not access external data, the prefetch buffer 108 transfers two words (two instructions) from cache 102 to cache 106 during phases 4–6.

Figure 2:
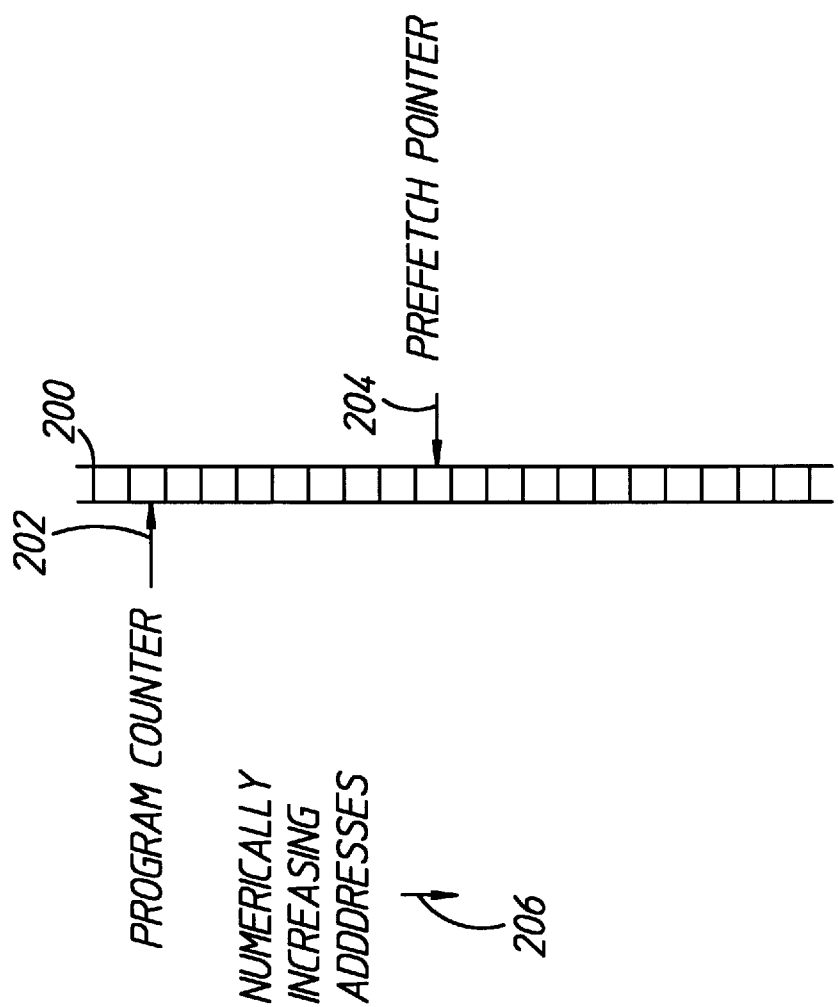
FIG. 2 is a block diagram illustrating instruction address pointers relative to the address space.

FIG. 2 illustrates a portion of linear address space 200. Addresses increase numerically as indicated by arrow 206. Usually, instructions are executed sequentially with addresses incrementing in the direction indicated by arrow 206. Prefetch buffer 108 (FIG. 1) must copy instructions from cache 102 to cache 106 in anticipation of processor need. In FIG. 2, processor 100 has a program counter 202 containing the current instruction address. Program counter 202 is available to the prefetch buffer 108. The prefetch buffer 108 has a prefetch pointer 204 containing the address of the next instruction to be transferred from cache 102. In the specific embodiment, addressing is to the byte level. That is, the least significant bit of an address designates one byte of data. When the prefetch buffer 108 transfers two instructions from cache 102, the prefetch buffer 108 increments the prefetch pointer 204 by 2N where N is the number of bytes in a word. The program of course may branch to new area of memory. When a branch instruction is detected by the prefetch buffer 108, the prefetch pointer 204 is set to the new value of the program counter 202 plus 2N and concurrently, the prefetch address that is generated is derived directly from the branch target address. If for any reason the program counter 202 gets ahead of the prefetch pointer 204 (counter 202 numerically greater than pointer 204), the prefetch pointer 204 is set to the value of the program counter 202 plus 2N.

Figure 3:
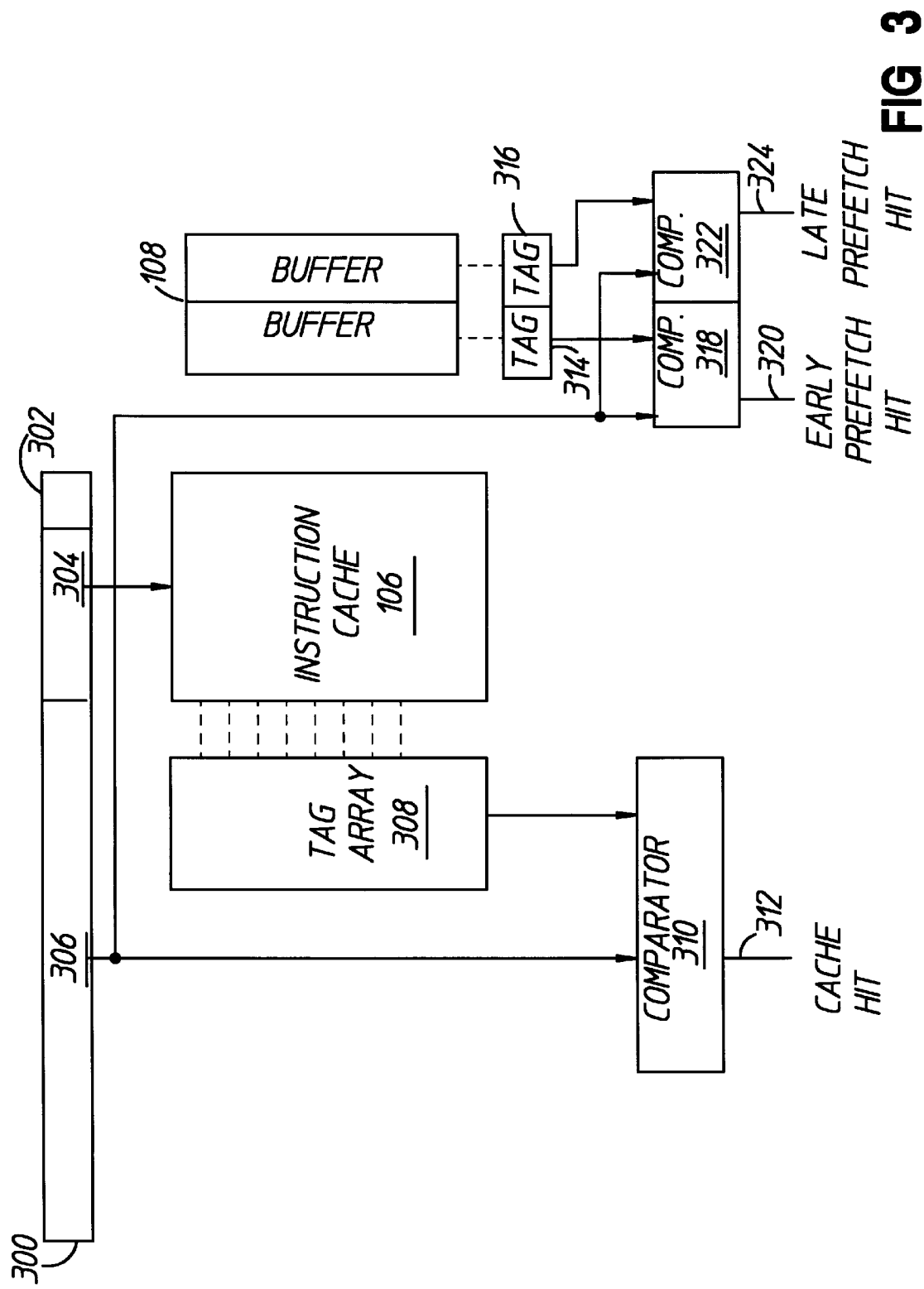
FIG. 3 is a block diagram schematic illustrating additional detail of part of the system of FIG. 1.

Since a cache is physically smaller than the address space being serviced, there must be some sort of mapping from a large instruction space to addresses within the cache. FIG. 3 illustrates the mapping in the specific embodiment. In FIG. 3, an address 300 is divided into three fields (302–306). The first field 302 contains the least significant bits designating the number of bytes in a word. Instruction addresses are always on word boundaries so that the lower order address bits may be ignored for instruction caching. The number of instructions in instruction cache 106 is an integral power of two. That is, there are $2^M$ instructions in cache 106 where M is an integer. Therefore, M bits determine a unique address within the cache 106. Field 304 is the least significant M bits of the word address portion of instruction address 300.

A tag array 308 contains upper order address bits for each instruction stored in cache 106. Instructions are read and cached in pairs. There are $2^{M-1}$ numbers in the tag array 308, each corresponding to two instructions in cache 106. Each number in the tag array 308 is all the upper address bits (field 306). Comparator 310 compares the upper address bits (field 306) with the contents of the tag array corresponding to the cache address determined by field 304. When an instruction address is asserted during phase 1, if the upper address bits of the address are in the tag array 308 then the instruction is in the instruction cache 106 and there is a cache hit 312.

The prefetch buffer 108 contains two instructions that have already been read but not yet placed into the cache 106. In addition, the prefetch buffer 108 may be in the process of reading two more instructions. The pair of instructions already in the buffer have one tag address 314. If a pair of instructions is being read, there will be one additional tag address 316. Comparator 318 compares the upper address bits to tag address 314. When an instruction address is asserted during phase 1, if field 306 of the address matches tag 314 then the instruction is in the prefetch buffer 108 and there is an early prefetch hit 320. Comparator 322 compares the upper address bits to tag address 316. When an instruction address is asserted during phase 1, if field 306 of the address matches tag 316 then the instruction is available immediately from the instruction/data cache 102 (see bus 114 path going to the multiplexer 110 in FIG. 1) and there is a late prefetch hit 324.

FIGS. 4–6 illustrate timing for various possible scenarios involving the instruction cache 106. In FIG. 4, a clock 400 is the system clock driving the processor 100 and associated logic. An instruction address is asserted on the instruction bus (FIG. 1, 116) during time 402. If there is a cache hit (FIG. 3, 316), an early prefetch hit (FIG. 3, 322) or a late prefetch hit (FIG. 3, 324), the instruction is available on the instruction bus (FIG. 1, 122) during time 404.

FIG. 5 applies to two scenarios. One scenario is that the prefetch pointer (FIG. 2, 204) is barely staying ahead of the program counter (FIG. 2, 202). The prefetch buffer receives address 116 during time 500 and immediately asserts the instruction address 116 as a data address 112 at time 502. The instruction/data cache 102 provides the instruction on the instruction bus 122 during time 504 (via bus 114 and multiplexer 110). FIG. 5 is also applicable to the target address of a branch instruction. When a branch is recognized, the target address (the next instruction address after the instruction following the branch) is immediately asserted as a data address 112 for the data/instruction cache 102, without waiting to see if there is an instruction cache hit 312. If there is an instruction cache hit, the target address is available at time 404 in FIG. 4. If there is an instruction cache miss, the target address is available at time 504 in FIG. 5. In either scenario for FIG. 5, an address from the data/instruction cache 102 is returned at time 504 one clock cycle later than for a cache hit (FIG. 4, time 404).

FIG. 6 applies when there is an instruction cache miss (other than the scenarios described above in conjunction with FIG. 5) and the instruction is fetched from the data/instruction cache 102. The instruction address is asserted on bus 116 during time 600. There is a cache miss and detection of the cache miss causes the prefetch buffer 108 to assert the instruction address as a data address onto bus 112 during time 602. The data/instruction cache 102 provides an instruction on the instruction bus 122 during time 604. Note that a complete instruction cache miss results in a delay of two clock cycles relative to a cache hit (FIG. 4, time 404).

From the above, it can be seen that the two level instruction cache provides fast instruction access much of the time with minimal penalty for an instruction cache miss. The instruction cache is relatively small so that it may be placed internal to an integrated circuit processor.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A cache memory system for instructions for a processor, the system comprising the following:

a first cache memory, accessible by the processor, containing instructions and data, the processor using the first cache memory as the primary source of data and fetching data directly from the first cache memory, the processor using the first cache memory as a secondary source for instructions;

a second cache memory, accessible by the processor, the second cache memory being substantially smaller than the first cache memory, the second cache memory containing a copy of a subset of the instructions from the first cache memory, the processor using the second cache memory as the primary source of instructions; and a prefetch buffer, connected between the first cache memory and the second cache memory, the prefetch buffer copying some of the instructions from the first cache memory to the second cache memory when the processor is not accessing the data in the first cache memory.

2. The cache memory system of claim 1 wherein the processor is contained within an integrated circuit, the first cache is external to the integrated circuit, and the second cache is internal to the integrated circuit.

3. A method of improving the performance of a processor in a computer system, the method comprising the following steps:

copying data and instructions from a main memory into a first cache memory;

accessing the first cache memory by the processor as the primary source of data;

accessing the first cache memory by the processor as a secondary source for instructions;

copying, by a prefetch buffer, some of the instruction from the first cache memory to a second cache memory when the processor is not accessing data in the first cache memory, wherein the prefetch buffer is connected between the first cache memory and the second cache memory; and accessing the second cache memory by the processor as the primary source of instructions.

4. The method of claim 3, further comprising the following steps:

recognizing a branch instruction; and immediately reading a target address of the branch instruction from the first cache memory.

5. The method of claim 3, further comprising the following steps:

maintaining a program counter that indicates a current instruction address;

maintaining a prefetch pointer that indicates an address of a next instruction to be transferred from the first cache memory to the second cache memory; and setting the prefetch pointer ahead of the program counter when the current instruction address is the same or greater than the address designated by the prefetch pointer.

6. The method of claim 3, further comprising the following steps:

maintaining a program counter that indicates a current instruction address;

maintaining a prefetch pointer that indicates an address of a next instruction to be transferred from the first cache memory to the second cache memory; and setting the prefetch pointer to a target address of a branch instruction when a branch instruction is executed.

\* \* \* \* \*